(12) United States Patent
Suzuki et al.

(10) Patent No.: US 9,251,832 B2
(45) Date of Patent: Feb. 2, 2016

(54) HEXAGONAL FERRITE MAGNETIC POWDER AND MAGNETIC RECORDING MEDIUM

(71) Applicant: FUJIFILM Corporation, Minato-ku, Tokyo (JP)

(72) Inventors: Hiroyuki Suzuki, Minami-ashigara (JP); Toshio Tada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/223,139

(22) Filed: Mar. 24, 2014

(65) Prior Publication Data

US 2014/0287270 A1    Sep. 25, 2014

(30) Foreign Application Priority Data

Mar. 25, 2013    (JP) .................................. 2013-062332

(51) Int. Cl.
G11B 5/708    (2006.01)
G11B 5/706    (2006.01)
H01F 1/11    (2006.01)

(52) U.S. Cl.
CPC .............. *G11B 5/70678* (2013.01); *H01F 1/11* (2013.01); *Y10T 428/2982* (2015.01)

(58) Field of Classification Search
None
See application file for complete search history.

(56) References Cited

U.S. PATENT DOCUMENTS

| | | | |
|---|---|---|---|
| 6,689,455 | B2 | 2/2004 | Masaki |
| 2003/0049490 | A1 | 3/2003 | Masaki |
| 2005/0153062 | A1* | 7/2005 | Naoe .............................. 427/127 |
| 2010/0021771 | A1 | 1/2010 | Yamazaki et al. |
| 2011/0123830 | A1* | 5/2011 | Tohji et al. .................... 428/800 |
| 2012/0177951 | A1 | 7/2012 | Yamazaki et al. |
| 2012/0251844 | A1 | 10/2012 | Yamazaki et al. |

FOREIGN PATENT DOCUMENTS

| | | |
|---|---|---|
| JP | 62-041580 A | 2/1987 |
| JP | 2002-298333 A | 10/2002 |
| JP | 2006-120823 A | 5/2006 |
| JP | 2010-024113 A | 2/2010 |
| JP | 2010-239067 A | 10/2010 |
| JP | 4675581 B2 | 4/2011 |
| JP | 2011-178654 A | 9/2011 |
| JP | 2012-142529 A | 7/2012 |
| JP | 2012-204726 A | 10/2012 |

OTHER PUBLICATIONS

Office Action dated Mar. 10, 2015 from the Japanese Patent Office in counterpart JP Application No. 2013-062332.

* cited by examiner

*Primary Examiner* — Holly Rickman
*Assistant Examiner* — Linda Chau
(74) *Attorney, Agent, or Firm* — Sughrue Mion, PLLC

(57) ABSTRACT

An aspect of the present invention relates to hexagonal ferrite magnetic powder, which has an activation volume ranging from 900 nm$^3$ to 1,600 nm$^3$, and a ratio of a coefficient of plate thickness variation to a coefficient of particle diameter variation, coefficient of plate thickness variation/coefficient of particle diameter coefficient, ranging from 0.20 to 0.60.

16 Claims, 2 Drawing Sheets

Plate thickness CV/Particle Diameter CV

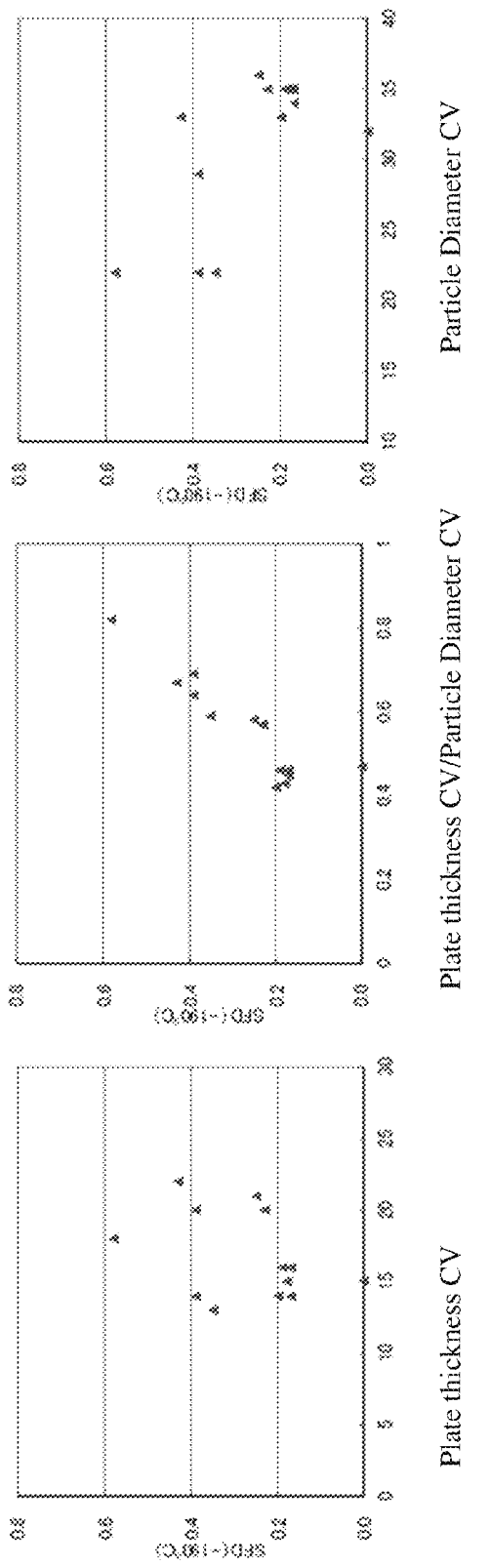

HEXAGONAL FERRITE MAGNETIC POWDER AND MAGNETIC RECORDING MEDIUM

CROSS-REFERENCE TO RELATED APPLICATIONS

This application claims the benefit of priority under 35 USC 119 to Japanese Patent Application No. 2013-062332 filed on Mar. 25, 2013, which is expressly incorporated herein by reference in its entirety.

BACKGROUND OF THE INVENTION

1. Field of the Invention

The present invention relates to hexagonal ferrite magnetic powder and to a method of manufacturing the same. More particularly, the present invention relates to hexagonal ferrite magnetic powder that is suitable for use as the ferromagnetic powder of a magnetic recording medium for high-density recording, and to a method of manufacturing the same.

The present invention further relates to a magnetic recording medium comprising the above hexagonal ferrite magnetic powder.

2. Discussion of the Background

Conventionally, ferromagnetic metal magnetic powder has primarily been employed in the magnetic layers of magnetic recording media for high-density recording. Ferromagnetic metal magnetic powder is comprised primarily of acicular particles consisting mainly of iron. To achieve high-density recording, efforts have been made to reduce the size of the particles and increase their coercive force. They have been employed in magnetic recording media used in various applications.

With the increase in the amount of information being recorded, ever higher density recording has been demanded of magnetic recording media. However, in achieving even higher density recording, limits to the improvement of ferromagnetic metal magnetic powder have begun to appear. By contrast, magnetic recording media with magnetic layers in which hexagonal ferrite magnetic powder is employed have better high-density characteristics in their vertical components. Accordingly, hexagonal ferrite magnetic powder is ferromagnetic material that is suited to achieving even higher densities. Thus, in recent years, various investigation has been conducted into magnetic recording media employing hexagonal ferrite magnetic powder (for example, see Japanese Unexamined Patent Publication (KOKAI) No. 2011-178654; Japanese Unexamined Patent Publication (KOKAI) No. 2012-142529 or English language family member US2012/177951A1; Japanese Unexamined Patent Publication (KOKAI) No. 2012-204726 or English language family member US2012/251844A1; Japanese Unexamined Patent Publication (KOKAI) No. 2006-120823; Japanese Patent No. 4675581; and Japanese Unexamined Patent Publication (KOKAI) No. 2010-239067, which are expressly incorporated herein by reference in their entirety).

SUMMARY OF THE INVENTION

In recent years, ever higher density recording has been achieved. Recording densities in the form of surface recording densities of 1 Gbpsi and above, even 10 Gbpsi and above, have been targeted. To achieve such high-density recording, the use of hexagonal ferrite magnetic particles of even smaller size has been required to reduce noise.

To further reduce noise, it is desirable to reduce the switching field distribution (SFD), which indicates the coercive force distribution of magnetic material. A magnetic recording medium comprising magnetic material of low SFD can permit the reproduction with low noise of a signal that has been recorded at high density, thereby achieving a high signal-to-noise-ratio (SNR). However, when the particle size of magnetic material is reduced, the effects of thermal fluctuation increase, making it difficult to maintain and enhance magnetic characteristics. As a result, it is difficult to simultaneously achieve both a reduction in particle size and a low SFD. Conventional techniques, including those disclosed in the above publications, while achieving smaller particles, do not readily yield hexagonal ferrite magnetic powder exhibiting a low SFD.

An aspect of the present invention provides for a means of achieving both a reduction in the particle size of hexagonal ferrite magnetic powder and a lower SFD.

Hexagonal ferrite is hexagonal plate-like magnetic material. The shape is specified by the particle diameter (plate diameter) and plate thickness. For example, in Japanese Unexamined Patent Publication (KOKAI) No. 2006-120823, Japanese Patent No. 4675581, and Japanese Unexamined Patent Publication (KOKAI) No. 2010-239067, it is described that the distribution of particle diameter should be sharp.

By contrast, the present inventors conducted extensive research. As a result, they discovered that when achieving a sharp particle diameter distribution, it was difficult to lower the SFD of fine particulate hexagonal ferrite magnetic powder. With regard to the particle diameter distribution, they made the new discovery, previously unknown, that by achieving a relatively sharp plate thickness distribution, it was possible to achieve hexagonal ferrite magnetic powder that was of fine particle size, could exhibit a low SFD, and had good thermal stability.

The present inventors conducted further extensive research based on the above discovery, and on that basis, devised an aspect of the present invention.

An aspect of the present invention relates to hexagonal ferrite magnetic powder, which has:

an activation volume ranging from 900 $nm^3$ to 1,600 $nm^3$, and a ratio of a coefficient of plate thickness variation to a coefficient of particle diameter variation, coefficient of plate thickness variation/coefficient of particle diameter coefficient, ranging from 0.20 to 0.60.

In an embodiment, the above hexagonal ferrite magnetic powder has a coercive force ranging from 195 kA/m to 400 kA/m.

In an embodiment, the above hexagonal ferrite magnetic powder exhibits a switching field distribution, SFD, ranging from 0.2 to 0.8.

In an embodiment, the above hexagonal ferrite magnetic powder has a specific surface area ranging from 80 $m^2/g$ to 150 $m^2/g$.

In an embodiment, in the above hexagonal ferrite magnetic powder, the content of rare earth element relative to Fe ranges from 0 atomic percent to 0.1 atomic percent.

In an embodiment, the above hexagonal ferrite magnetic powder comprises 1.5 atomic percent to 20 atomic percent of Al relative to Fe.

In an embodiment, the above hexagonal ferrite magnetic powder is magnetic powder for magnetic recording.

A further aspect of the present invention relates to a magnetic recording medium comprising a magnetic layer comprising ferromagnetic powder and binder on a nonmagnetic support, wherein the ferromagnetic powder is the above hexagonal ferrite magnetic powder.

A further aspect of the present invention relates to a method of manufacturing the above hexagonal ferrite magnetic powder, which comprises:

preparing the above hexagonal ferrite magnetic powder by a glass crystallization method with the use of a starting material mixture comprising a glass-forming component and a hexagonal ferrite-forming component.

In an embodiment, the starting material mixture comprises 30 mole percent to 50 mole percent of BaO component per 100 mole percent of the total quantity of the starting material mixture.

In an embodiment, the starting material mixture comprises 20 mole percent to 50 mole percent of $Fe_2O_3$ component per 100 mole percent of the total quantity of the starting material mixture.

In an embodiment, the starting material mixture comprises 1 mole percent to 15 mole percent of $Al_2O_3$ component per 100 mole percent of the total quantity of the starting material mixture.

In an embodiment, the glass crystallization method is conducted by:

melting the starting material mixture in a melting tank;

discharging the melt through an outlet provided in the bottom of the melting tank and feeding the melt between a pair of pressure rolls that rotate and are positioned beneath the melting tank;

discharging the amorphous material from between the rolls by extending by applying pressure and cooling the melt that is supplied between the pressure rolls;

heat treating the amorphous material to cause hexagonal ferrite magnetic particles to precipitate; and collecting the hexagonal ferrite magnetic particles that have precipitated from the material obtained by the heat treatment;

where the discharge of the melt from the outlet is conducted in the form of a continuous flow of melt at a flow rate of 1 g/s to 5 g/s.

In an embodiment, the discharge of the melt from the outlet is conducted by applying pressure within the melting tank while stirring the melt.

An aspect of the present invention can provide a magnetic recording medium exhibiting good electromagnetic characteristics in the high-density recording region.

Other exemplary embodiments and advantages of the present invention may be ascertained by reviewing the present disclosure and the accompanying drawing.

BRIEF DESCRIPTION OF THE DRAWINGS

FIGS. 1A to 1F are graphs showing the relation between the ratio (coefficient of plate thickness variation/coefficient of particle diameter variation), coefficient of plate thickness variation, and coefficient of particle diameter variation to the thermal stability of the hexagonal ferrite magnetic powder and the SFD.

DETAILED DESCRIPTION OF THE EMBODIMENTS

Figure 1D:
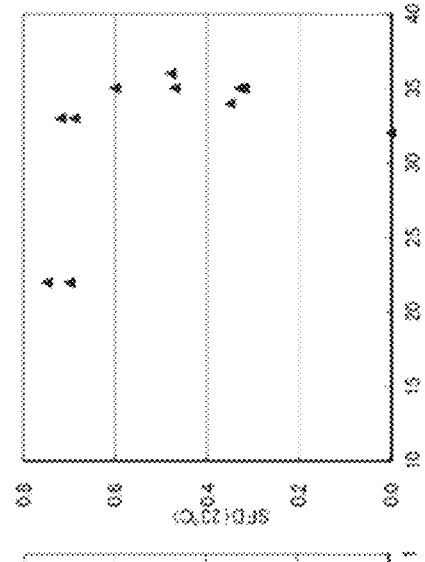

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

An aspect of the present invention relates to hexagonal ferrite magnetic powder, which has an activation volume ranging from 900 $nm^3$ to 1,600 $nm^3$, and a ratio of a coefficient of plate thickness variation to a coefficient of particle diameter variation (coefficient of plate thickness variation/coefficient of particle diameter coefficient) ranging from 0.20 to 0.60.

The hexagonal ferrite magnetic powder of an aspect of the present invention will be described in greater detail below.

The hexagonal ferrite magnetic powder of an aspect of the present invention has an activation volume ranging from 900 $nm^3$ to 1,600 $nm^3$. The activation volume is a unit of magnetization reversal, an index indicating the magnetic size of magnetic material. Having an activation volume of equal to or less than 1,600 $nm^3$ makes it possible to lower noise and achieve a high SNR in the high-density recording region. By contrast, when the magnetization reversal volume exceeds 1,600 $nm^3$, the particle size is large and thus the magnetic material fill rate in the medium decreases, compromising the performance of the medium. Additionally, in hexagonal ferrite magnetic powder with an activation volume of less than 900 $nm^3$, the particles are excessively small, making it difficult to maintain good magnetic characteristics. Further, they are difficult to disperse, compromising the performance of the medium. In hexagonal ferrite magnetic powder with an activation volume of less than 900 $nm^3$, even when the above ratio is controlled, it is difficult to maintain good thermal stability. The activation volume desirably falls within a range of 900 $nm^3$ to 1,500 $nm^3$, preferably within a range of 1,000 $nm^3$ to 1,500 $nm^3$. The activation volume can be measured by the method disclosed in Examples further below.

The activation volume is an index of the magnetic size of magnetic material, as stated above. In contrast, for the physical size of magnetic material, it is possible to indicate the specific surface area, for example. Having both a small magnetic size in magnetic material and a small physical size in magnetic material is desirable from the perspective of further noise reduction. For that reason, the hexagonal ferrite magnetic powder of an aspect of the present invention desirably has as large a specific surface area as is possible. Having a particle size with a specific surface area falling within a range of 80 m²/g to 150 m²/g is desirable, and having a specific surface area falling within a range of 90 m²/g to 150 m²/g, even 90 m²/g to 140 m²/g, is preferred. The specific surface area referred to in the present invention is the specific surface area $S_{BET}$ by the BET method.

The activation volume and specific surface area of hexagonal ferrite magnetic powder can be controlled by means of the manufacturing conditions of the magnetic particles. For example, when they are manufactured by the glass crystallization method, the crystallization conditions (crystallization temperature, the period of maintenance at that temperature, and the like) can be used to control the activation volume and specific surface area of the hexagonal ferrite magnetic powder that is obtained.

In addition to having the above-stated particle size, the hexagonal ferrite magnetic powder of an aspect of the present invention has a ratio (coefficient of plate thickness variation/coefficient of particle diameter variation) of the coefficient of plate thickness variation to the coefficient of particle diameter variation that falls within a range of 0.20 to 0.60. This ratio will be denoted as X, hereinafter. A coefficient of plate thickness variation that is relatively small with respect to the coefficient of particle diameter variation, that is, a plate thickness distribution that is relatively sharp with respect to the particle diameter distribution, was discovered for the first time through extensive research conducted by the present inventors to contribute to lowering the SFD of the hexagonal ferrite of fine particles. An aspect of the present invention was devised on that basis. The smaller the magnetic particles, the greater the tendency to be affected by thermal fluctuation and the greater the tendency for recording retention to decrease. By contrast, in hexagonal ferrite magnetic powder with an X of 0.20 to 0.60, the fine particles have an activation volume falling within the above-stated range, but they also can have high thermal stability. This was discovered through research conducted by the present inventors.

The ratio X is an index of the relative sharpness of the plate thickness distribution relative to the particle diameter distribution. When ratio X exceeds 0.60, the crystal magnetic anisotropy distribution increases, inviting an increase in SFD, and the thermal stability tends to drop. From the perspective of the ability to maintain recording, the higher the coercive force Hc the better. However, when X exceeds 0.60, the coercive force Hc tends to drop. Accordingly, in an aspect of the present invention, X is set to equal to or less than 0.60. Additionally, the farther below 0.20 that X drops, the more difficult it becomes to fabricate hexagonal ferrite with a sharp plate thickness distribution relative to the particle diameter distribution using existing technology. Thus, X is also set to equal to or higher than 0.20. X desirably falls within a range of 0.20 to 0.50, preferably within a range of 0.30 to 0.50, and more preferably, within a range of 0.40 to 0.50.

The method of controlling X will be described further below.

The coefficient of plate thickness variation and the coefficient of particle diameter variation of hexagonal ferrite magnetic powder can be calculated as follows, for example. Five hundred particles are extracted in a photograph taken by a transmission electron microscope, and the average value of the plate thicknesses that are measured (average plate thickness) and the average value (average particle diameter) of the particle diameter (plate diameter) are obtained. The standard deviations of the plate thickness and plate diameter of these 500 particles are calculated and divided by the average values.

The particle size of the hexagonal ferrite magnetic powder in the present invention can be measured by the following method. The particle size of other powders can also be measured according to the following method.

A 1 mg quantity of powder such as hexagonal ferrite magnetic powder is placed in 5 mL of pure water and the mixture is charged to a polypropylene vial (11 mL capacity). An Ultra Sonic multi cleaner W-113 (made by Honda Electronics Co., Ltd.) is used to prepare an aqueous dispersion under conditions of 28 kHz×10 minutes. Next, 5 µL of the dispersion is dripped onto an elastic carbon support film and allowed to dry naturally. Subsequently, a Hitachi Model H-9000 transmission electron microscope is used to photograph the particles at 100,000-fold magnification. The photo is then printed on paper at 500,000-fold magnification to obtain a particle photograph. Particles the plate surfaces of which are oriented in a vertical direction are selected in the particle photograph and the outlines of the particles are traced with a digitizer. Karl Zeiss image analysis software KS-400 is used to measure the particle size. The maximum major axis corresponding to a diagonal line in the contour that has been traced is adopted as the particle diameter, and the minimum major axis is adopted as the plate thickness. Five hundred particles are measured for each, the average value of the particle diameter and its standard deviation are calculated, and the average value of the plate thickness and its standard deviation are calculated.

In terms of the magnetic characteristics of the hexagonal ferrite magnetic powder of an aspect of the present invention, from the perspective of recording retention, the coercive force Hc desirably falls within a range of 195 kA/m to 400 kA/m, preferably within a range of 200 kA/m to 360 kA/m. As set forth above, from the perspective of reducing noise in a magnetic recording medium containing fine particulate hexagonal ferrite magnetic powder, a low SFD is good, desirably falling within a range of 0.2 to 0.8, and preferably falling within a range of 0.2 to 0.6. Unless specifically stated otherwise, magnetic characteristics such as the Hc and SFD in the present invention are values measured at 23° C.

As set forth above, it is possible to achieve an SFD falling within the above-stated desirable range by controlling the value of X to within a range of 0.2 to 0.6. The Hc can be controlled by means of the starting material composition of the hexagonal ferrite, the manufacturing conditions (for example, the crystallization conditions in the glass crystallization method), and the like.

The hexagonal ferrite magnetic powder of an aspect of the present invention can be fine particulate magnetic powder having an activation volume falling within the above-stated range. This can contribute to achieving a high SNR in the high-density recording region. Since the ratio (coefficient of plate thickness variation/coefficient of particle diameter variation) of the coefficient of plate thickness variation to the coefficient of particle diameter variation falls within a range of 0.20 to 0.60, it is possible to achieve a lower SFD and improve the thermal stability. That in turn makes it possible to achieve a noise reduction and control signal decay in the magnetic recording medium containing it, and it becomes possible to provide a magnetic recording medium with good electromagnetic characteristics (a high SNR) in the high-density recording region, as well as high reliability. Accordingly, the hexagonal ferrite magnetic powder of an aspect of the present invention is suitable as magnetic recording-use magnetic powder in various magnetic recording media such as backup tapes that are required to permit use over extended periods with high reliability. Details on embodiments of application of the hexagonal ferrite magnetic powder of an aspect of the present invention as magnetic recording-use magnetic powder are given further below.

So long as the hexagonal ferrite magnetic powder of an aspect of the present invention has the above characteristics, the manufacturing method is not specifically limited. A known method of manufacturing hexagonal ferrite magnetic powder, such as the glass crystallization method, hydrothermal synthesis method, or coprecipitation method, can be employed to manufacture the hexagonal ferrite magnetic powder of an aspect of the present invention. From the perspective of ease of manufacturing fine particulate magnetic powder having an activation volume falling within the above-stated range, the glass crystallization method is desirable.

The glass crystallization method generally comprises the following steps:
(1) a step of melting a starting material mixture containing a hexagonal ferrite-forming component (including an optional coercive force-adjusting component) and a glass-forming component to obtain a melt (melting step);
(2) a step of quenching the melt to obtain an amorphous material (amorphous material rendering step);
(3) a step of subjecting the amorphous material to a heat treatment to precipitate hexagonal ferrite particles (crystallization step); and
(4) a step of collecting the hexagonal ferrite magnetic particles that have precipitated from the heat-treated product (particle collecting step).

The present inventors conducted extensive research. As a result, they discovered that obtaining an amorphous material of high homogeneity in step (2) above was effective for obtaining hexagonal ferrite magnetic powder having a ratio X falling within a range of 0.2 to 0.6 to achieve a relatively sharp plate thickness distribution with regard to the particle diameter distribution in the glass crystallization method. Thus, the use of a readily vitrifying composition as the starting material mixture was one effective method. This was because a starting material mixture with a readily vitrifying composition underwent severe crystallization during quenching, making it possible to obtain an amorphous material of high homogeneity. Increasing the quenching efficiency in step (2) was another effective means of obtaining a homogeneous amorphous material. Accordingly, when obtaining the hexagonal ferrite magnetic powder of an aspect of the present invention by the glass crystallization method, these methods were desirably optionally combined.

The above means will be described in greater detail below.

As set forth above, the starting material mixture employed in the glass crystallization method comprises a hexagonal ferrite-forming component (including an optional coercive force-adjusting component) and a glass-forming component. In this context, the term "glass-forming component" is used to mean a component that is capable of exhibiting a vitreous transition to become amorphous (vitrification). A $B_2O_3$ component is used in the usual glass crystallization method. A starting material mixture containing a $B_2O_3$ component as a glass-forming component can be employed in the present invention, as well. In the glass crystallization method, the various components that are contained in the starting material mixture are present as oxides, or as various salts that can change into oxides in the melting step or the like. In the present invention, the term "$B_2O_3$ component" includes $B_2O_3$ itself, as well as various salts such as $H_3BO_3$ that become $B_2O_3$ during processing. The same applies to the other components. The composition of the starting material mixture that is described further below is a composition that is based on conversion to oxides. Examples of glass-forming components in addition to the $B_2O_3$ component are an $SiO_2$ component, $P_2O_5$ component, and $GeO_2$ component. It is also possible to employ an $Al_2O_3$ component.

Examples of hexagonal ferrite-forming components that are contained in the starting material mixture are metal oxides such as $Fe_2O_3$, BaO, SrO, and PbO, which are the constituent components of hexagonal ferrite magnetic particles. For example, the use of a BaO component as a principal component among the hexagonal ferrite-forming components makes it possible to obtain barium ferrite magnetic powder.

It is also possible to obtain hexagonal ferrite magnetic powder in which a portion of the Fe is substituted with other metal elements to adjust the coercive force. Examples of the substitution elements are Co—Zn—Nb, Zn—Nb, Co, Zn, Nb, Co—Ti, Co—Ti—Sn, Co—Sn—Nb, Co—Zn—Sn—Nb, Co—Zn—Zr—Nb, Co—Zn—Mn—Nb. To obtain such hexagonal ferrite magnetic powder, it suffices to employ components for adjusting the coercive force in combination as hexagonal ferrite-forming components. Examples of coercive force-adjusting components are divalent metal oxide components such as CoO and ZnO; tetravalent metal oxide components such as $TiO_2$, $ZrO_2$, $SnO_2$, and $MnO_2$; and pentavalent metal oxide components such as $Nb_2O_5$. When employing these coercive force-adjusting components, it suffices to suitably determine the content thereof in conjunction with the desired coercive force.

The calorific value (also referred to as the "DSC calorific value", hereinafter) obtained by differential scanning calorimetry (DSC) can be employed as an indicator of a readily vitrifying composition. The lower the calorific value, the smaller the quantity of crystals generated, that is, the greater the tendency to vitrify (become amorphous).

One method of obtaining a starting material mixture with a low DSC calorific value, for example, is to control the concentration of the hexagonal ferrite-forming components in the starting material mixture. The use of a composition containing 20 mole percent to 50 mole percent of $Fe_2O_3$ component (in which a portion of the $Fe_2O_3$ component can be replaced with the above coercive force-adjusting components) per 100 mole percent of the total quantity of the starting material mixture is desirable for obtaining a starting material mixture with a low DSC calorific value, and the use of a composition containing 25 mole percent to 45 mole percent of $Fe_2O_3$ component is preferred.

An example of another means of obtaining a starting material mixture with a low DSC calorific value is to add a glass-forming component to the starting material mixture in the form of an $Al_2O_3$ component and/or an $SiO_2$ component. The content of the $Al_2O_3$ component desirably falls within a range of 1 mole percent to 15 mole percent, preferably within a range of 1 mole percent to 10 mole percent, and more preferably, within a range of 1.5 mole percent to 8.5 mole percent, per 100 mole percent of the total quantity of the starting material mixture. The hexagonal ferrite magnetic powder that is obtained can contain 1.5 atomic percent to 20 atomic percent of Al relative to Fe. The content of the $SiO_2$ component desirably falls within a range of 1 mole percent to 10 mole percent per 100 mole percent of the total quantity of starting material mixture. As yet another means, the BaO component that is employed when manufacturing barium ferrite, for example, is incorporated in relatively large quantity into the starting material mixture. The content of the BaO component desirably falls within a range of 30 mole percent to 50 mole percent, preferably within a range of 35.5 mole percent to 50 mole percent, and more preferably, within a range of 35.5 mole percent to 45 mole percent, per 100 mole percent of the total quantity of the starting material mixture. The same applies to the SrO component when obtaining strontium ferrite and the PbO component when obtaining lead ferrite.

Some of the above publications attempt to achieve their intended objects by adjusting the composition by selecting rare earth elements or specific Fe-substitution elements. By contrast, in an aspect of the present invention, the manufacturing conditions can be adjusted using ratio X as an indicator to achieve particle size reduction and a lower SFD without actively introducing expensive rare earth elements or selecting specific Fe-substitution elements. The content of rare earth elements, as the content in the hexagonal ferrite magnetic powder that is finally prepared, desirably falls within a range of 0 atomic percent to 0.1 atomic percent relative to Fe.

A means of increasing the quenching efficiency in the amorphous rendering step will be described next.

The steps that are normally included in the glass crystallization method are as set forth above. More specifically, the starting material mixture is melted in a melting tank, the melt is discharged through an outlet provided in the bottom of the melting tank, the melt is fed between a pair of rotating pressure rolls positioned beneath the melt tank, and the melt that is fed is extended by applying pressure and cooled between the pressure rolls to discharge an amorphous material from between the rolls. The amorphous material thus obtained is subjected to a heat treatment to cause hexagonal ferrite magnetic particles to precipitate, and the hexagonal ferrite magnetic particles that precipitate from the material obtained by means of the heat treatment are collected to obtain hexagonal ferrite magnetic particles by the glass crystallization method. Here, by causing a small quantity of the melt to continuously flow out, it is possible to reduce the heat load on the pressure rolls, achieve a thinner strip of amorphous material, and the like. Thus, the cooling efficiency in the amorphous rendering step can be enhanced. It is desirable for the discharge of the melt from the outlet to be conducted continuously at a flow rate of 1 g/s to 5 g/s. The starting material mixture with the readily vitrifying composition set forth above will generally be highly viscous, so there will be cases where achieving a continuous, small outflow will be difficult. In such cases, it is desirable to apply pressure within the melting tank while stirring the melt to generate an outflow.

Additionally, for example, reference can be made to Japanese Unexamined Patent Publication (KOKAI) No. 2012-204726, paragraphs 0013 to 0031, Japanese Unexamined Patent Publication (KOKAI) No. 2012-142529, paragraphs 0012 to 0030, Japanese Unexamined Patent Publication (KOKAI) No. 2011-2135443, paragraphs 0013 to 0035, and Japanese Unexamined Patent Publication (KOKAI) No. 2011-225417, paragraphs 0012 to 0026, and to Examples in the above publications, for details regarding the glass crystallization method. The contents of the above publications are expressly incorporated herein by reference in their entirety.

As set forth above, an aspect of the present invention relates to a method of manufacturing the hexagonal ferrite magnetic powder of an aspect of the present invention by a glass crystallization method with the use of a starting material mixture containing a glass-forming component and a hexagonal ferrite-forming component. The details are as set forth above.

A further aspect of the present invention relates to a magnetic recording medium comprising a magnetic layer comprising ferromagnetic powder and binder on a nonmagnetic support, wherein the hexagonal ferrite magnetic powder of an aspect of the present invention is contained as the ferromagnetic powder.

The hexagonal ferrite magnetic powder of an aspect of the present invention can be fine particulate magnetic particles having an activation volume falling within the above-stated range and exhibiting an X falling within a range of 0.2 to 0.6. By means of such hexagonal ferrite magnetic powder, the magnetic recording medium of an aspect of the present invention can exhibit a high SNR due to reduced noise in the high-density recording region, and can exhibit high thermal stability.

The magnetic recording medium of an aspect of the present invention will be described in greater detail below.

(Magnetic Layer)

Details of the hexagonal ferrite magnetic powder that is contained in the magnetic layer and the method of manufacturing it are as set forth above. The magnetic recording layer contains binder in addition to the hexagonal ferrite magnetic powder of an aspect of the present invention. It can also contain additives as needed in addition to the above components. For details regarding binders and additives that can be employed in the magnetic layer, for example, reference can be made to Japanese Unexamined Patent Publication (KOKAI) No. 2012-204726, paragraphs 0032 and 0033.

(Nonmagnetic Layer)

Detailed contents relating to the nonmagnetic layer will be described next. In the magnetic recording medium of an aspect of the present invention, a nonmagnetic layer containing nonmagnetic powder and binder can be present between the nonmagnetic support and the magnetic layer. For details regarding the nonmagnetic layer, reference can be made to Japanese Unexamined Patent Publication (KOKAI) No. 2012-204726, paragraphs 0034 and 0035.

(Layer Structure)

In the thickness structure of the magnetic recording medium of an aspect of the present invention, the thickness of the nonmagnetic support is desirably 3 µm to 80 µm. The thickness of the magnetic layer can be optimized based on the saturation magnetization and head gap length of the magnetic head employed, and the bandwidth of the recording signal. Generally, it is 0.01 µm to 0.15 µm, desirably 0.02 µm to 0.12 µm, and preferably, 0.03 µm to 0.10 µm. It suffices for there to be at least one magnetic layer. The magnetic layer can be separated into two or more layers having differing magnetic characteristics. Known multilayer magnetic layer configurations can be applied.

The thickness of the nonmagnetic layer is, for example, 0.1 µm to 3.0 µm, desirably 0.3 µm to 2.0 µm, and preferably, 0.5 µm to 1.5 µm. The nonmagnetic layer in the magnetic recording medium of an aspect of the present invention will be able to achieve its effect so long as it is substantially nonmagnetic. For example, the effect of an aspect of the present invention will be achieved even if impurities or unintentional trace amounts of magnetic material are contained in the nonmagnetic layer, and the configuration can be deemed to be substantially identical to that of the magnetic recording medium of an aspect of the present invention. The term "substantially identical" means that the residual magnetic flux density of the nonmagnetic layer is equal to or less than 10 mT, or the coercive force is equal to or less than 7.96 kA/m (100 Oe), desirably meaning that no residual magnetic flux density or coercive force is present.

Reference can be made to Japanese Unexamined Patent Publication (KOKAI) No. 2012-204726, paragraph 0036, with regard to the nonmagnetic support in the magnetic recording medium of an aspect of the present invention. A backcoat layer can be provided on the opposite surface of the nonmagnetic support from the surface on which the magnetic layer is provided. Reference can be made to Japanese Unexamined Patent Publication (KOKAI) No. 2012-204726, paragraph 0039, for details thereof.

It suffices for the magnetic recording medium of an aspect of the present invention to contain the hexagonal ferrite magnetic powder of an aspect of the present invention in the magnetic layer; the manufacturing method is not specifically limited. The common methods of manufacturing particulate magnetic recording media can be applied as the method of manufacturing the magnetic recording medium of an aspect of the present invention. For example, reference can be made to Japanese Unexamined Patent Publication (KOKAI) No. 2012-204726, paragraph 0040, for details regarding the manufacturing method.

By containing the hexagonal ferrite magnetic powder of an aspect of the present invention, the magnetic recording medium of an aspect of the present invention as set forth above can achieve good electromagnetic characteristics in the high-density recording region.

EXAMPLES

The present invention will be described in detail below based on Examples. However, the present invention is not limited to Examples. The terms "parts" and "percent" given in Examples are weight parts and weight percent unless specifically stated otherwise.

1. Preparation of Hexagonal Ferrite Magnetic Powder

Prescribed quantities of $H_3BO_3$ corresponding to $B_2O_3$, $Al(OH)_3$ corresponding to $Al_2O_3$, $BaCO_3$ corresponding to BaO, $Fe_2O_3$, and $Nb_2O_5$ corresponding to elemental Nb substituted for Fe were weighed out so as to yield the starting material composition shown in Table 1 based on oxides. The components were mixed in a mixer and the mixture was charged to a two-liter platinum crucible and melted. The melt was caused to flow out continuously at the rate indicated in Table 2 onto water-cooled rolls and cooled by the water-cooled rolls to obtain an amorphous material. The flow rate was adjusted in response to the glass viscosity by means of the nozzle diameter and by applying pressure.

A 600 g quantity of the amorphous material obtained was charged to an electric furnace, the temperature was raised over three hours to the crystallization temperature indicated in Table 2, and the material was maintained for the period indicated in Table 2 at the same temperature to crystallize hexagonal ferrite. The crystallized product containing the hexagonal ferrite was coarsely crushed with a mortar and pestle, charged to a three-liter pot mill, and pulverized for 4 hours in a ball mill along with 5 kg of φ5 mm Zr balls and 1.2 kg of pure water. The pulverized solution was separated from the balls and placed in a five-liter stainless steel beaker. The pulverized solution was reacted for 2 hours at 85° C. in an 8 percent acetic acid solution, cleaned by repeated decantation to remove the unwanted glass component, and dried, yielding hexagonal ferrite powder. The magnetic particles obtained were analyzed by X-ray diffraction, confirming them to be hexagonal ferrite (barium ferrite).

2. Preparation of a Magnetic Recording Medium (Magnetic Tape)

2-1. Formula of Magnetic Layer Coating Material

| | |
|---|---|
| Hexagonal barium ferrite magnetic powder (shown in Table 3): | 100 parts |
| Polyurethane resin: | 12 parts |
| Weight average molecular weight: 10,000 | |
| Sulfonic acid functional group content: 0.5 meq/g | |
| Diamond fine particles (average particles diameter: 50 nm): | 2 parts |
| Carbon black (#55, made by Asahi Carbon, particle size: 0.015 μm): | 0.5 part |
| Stearic acid: | 0.5 part |

-continued

| | |
|---|---|
| Butyl stearate: | 2 parts |
| Methyl ethyl ketone: | 180 parts |
| Cyclohexanone: | 100 parts |

2-2. Nonmagnetic Layer Coating Material

| | |
|---|---|
| Nonmagnetic powder α-iron oxide: | 100 parts |
| Average primary particle diameter: 0.09 μm | |
| Specific surface area by BET method: 50 m²/g | |
| pH: 7 | |
| DBP oil absorption capacity: 27 g/100 g to 38 g/100 g | |
| Surface treatment agent: $Al_2O_3$ 8 weight percent | |
| Carbon black (Conductex SC-U, made by Columbia Carbon): | 25 parts |
| Vinyl chloride copolymer (MR104, made by Zeon Corp.): | 13 parts |
| Polyurethane resin (UR8200, made by Toyobo): | 5 parts |
| Phenylphosphonic acid: | 3.5 parts |
| Butyl stearate: | 1 part |
| Stearic acid: | 2 parts |
| Methyl ethyl ketone: | 205 parts |
| Cyclohexanone: | 135 parts |

2-3. Preparation of Magnetic Tape

For each of the above coating materials, the various components were kneaded in a kneader. The mixture was circulated with a pump in a horizontal sand mill the dispersion element of which had been packed to 65 percent of volume with 1.0 mmφ zirconia beads and dispersion was conducted for 120 minutes (substantially the period of retention in the dispersing element) at 2,000 rpm. To the dispersion obtained were added 6.5 parts of polyisocyanate in the case of the nonmagnetic layer coating material. Seven parts of methyl ethyl ketone were then added. The mixture was passed through a filter having an average pore diameter of 1 μm to prepare coating materials for forming the nonmagnetic layer and the magnetic layer, respectively.

The nonmagnetic layer coating material obtained was coated and dried to a thickness of 1.0 μm on a polyethylene naphthalene base 5 μm in thickness, after which sequential multilayer coating was conducted to form a magnetic layer 70 nm in thickness. Following drying, the product was treated with a seven-stage calender at a linear pressure of 300 kg/cm at a temperature of 90° C. It was then slit to ¼ inch width and subjected to a surface polishing treatment, yielding magnetic tapes (Nos. 1 to 5).

3. Evaluation of the Magnetic Powder and Magnetic Tapes

The magnetic powder and magnetic tapes were evaluated by the following methods. Unless specifically stated otherwise, the various evaluations were conducted at room temperature (23° C.).

(1) Coefficient of Plate Thickness Variation (Plate Thickness CV), Coefficient of Particle Diameter Variation (CV), and Ratio X A photograph was taken by a transmission electronic microscope of the magnetic powder obtained and 500 particles were extracted from the photograph. The average value of the plate thickness was adopted as the average plate thickness and the average value of the particle diameter was adopted as the average particle diameter. The standard deviation of 500 measured values was determined, and the value obtained by subtracting the average value from it was obtained as the coefficient of variation. The details of the measurement method were as given above. Ratio X was then calculated from the coefficient of plate thickness variation and coefficient of particle diameter variation thus obtained.

(2) Magnetic Characteristics (Hc)

The coercive force Hc of the magnetic powder prepared was measured with a vibrating sample magnetometer (made by Toei-Kogyo Co., Ltd.) at a magnetic field strength of 1,194 kA/m (15 kOe).

(3) SFD (23° C.), SFD (−190° C.)

The SFD of the magnetic particles prepared was measured with a vibrating sample magnetometer (made by Toei-Kogyo Co., Ltd.) at a magnetic field strength of 1,194 kA/m (15 kOe) at room temperature (23° C.). The SFD at −190° C. was obtained by packing the various magnetic powders into aluminum cells and using a thermocouple set near the cells to conduct measurement under conditions at which the temperature of the magnetic powder reached −190° C. In the measurement, the entire vibrating sample bar of the vibrating sample magnetometer was placed within a quartz tube, and while drawing a vacuum with a rotary pump, immersed in a Dewar flask filled with liquid nitrogen. The temperature was controlled by passing a current through an electric heater equipped with a quartz tube.

The SFD of magnetic powder No. 6 could not be measured due to thermal fluctuation.

(4) Quantification of Al Content

A 0.01 g quantity of the magnetic powder obtained was immersed in 10 mL of 4N—HCl solution and dissolved by heating for 3 hours at 80° C. on a hot plate. The solution was diluted. Subsequently, Fe and Al were quantified by ICP to determine the quantity of Al (atomic percent) relative to Fe.

(5) Output, Noise, and SNR

The reproduction output, noise, and SNR of the magnetic tape prepared were measured after mounting a recording head (MIG, 0.15 μm gap, 1.8 T) and a reproduction-use GMR head (reproduction track width: 1 μm) on a loop tester and recording a signal at a linear recording density of 200 kfci.

(6) Signal Decay

The reproduction output of the magnetic tape prepared was measured by mounting a recording head (MIG, 0.15 μm gap, 1.8 T) and a reproduction-use GMR head (reproduction track width: 1 μm) on a loop tester, recording a signal at a linear recording density of 200 kfci, repeatedly reproducing the recorded signal, and measuring the output attenuation of the recorded signal for the time from recording to reproduction. Those exhibiting values below the detection threshold (−0.5%/decade) were denoted as >−0.5%/decade, with almost no signal decay.

(7) Activation Volume V (Vact), Anisotropic Constant Ku, KuV/kT

A vibrating sample magnetometer (made by Toei-Kogyo Co., Ltd.) was used to measure the magnetic field sweep rate of the Hc measuring element at 3 minutes and at 30 minutes. The activation volume and anisotropic constant Ku were subsequently measured from the relational equation of the magnetization reversal volume and the Hc due to the thermal fluctuation. KuV/kT was calculated from the value obtained.

$$Hc = 2Ku/Ms(1-[(KuT/kV)\ln(At/0.693)]1/2)$$

(In the above equation, Ku: anisotropic constant; Ms: saturation magnetization; k: Boltzmann constant; T: absolute temperature; V: activation volume; A: spin precession frequency; t: magnetic field reversal time.)

Details of the starting material compositions of the magnetic powder set forth above are given in Table 1. The flow rate during magnetic powder preparation, crystallization temperature, and evaluation results of the magnetic powder prepared are given in Table 2. Details of the magnetic tapes prepared are given in Table 3.

TABLE 1

| Amorphous No. | Starting material | Element substituting Fe |
|---|---|---|
| A | BaO: 41.1 mol %, $B_2O_3$: 24.1 mol %, $Al_2O_3$: 7.0 mol %, $Fe_2O_3$: 27.8 mol % | Nb/Fe = 1.0 at % |
| B | BaO: 36.6 mol %, $B_2O_3$: 26.2 mol %, $Al_2O_3$: 2.3 mol %, $Fe_2O_3$: 34.9 mol % | Zn/Nb = 1.9 at %, Nb/Fe = 0.95 at % |
| C | BaO: 35.7 mol %, $B_2O_3$: 14.9 mol %, $Al_2O_3$: 8.1 mol %, $Fe_2O_3$: 41.3 mol % | Nb/Fe = 1.0 at % |
| D | BaO: 35.2 mol %, $B_2O_3$: 24.1 mol %, $Al_2O_3$: 5.3 mol %, $Fe_2O_3$: 35.4 mol % | Zn/Fe = 7.0 at %, Nb/Fe = 3.0 at % |
| E | BaO: 35.2 mol %, $B_2O_3$: 29.4 mol %, $Fe_2O_3$: 35.4 mol % | Zn/Fe = 1.5 at % |
| F | BaO: 35.2 mol %, $B_2O_3$: 27.6 mol %, $Al_2O_3$: 1.8 mol %, $Fe_2O_3$: 35.4 mol % | Zn/Fe = 3.0 at % |

TABLE 2

| Magnetic material No. | Amorphous No. | Flow rate of melt (g/s) | Crystallization temperature (° C.) | Crystallization time (h) | $S_{BET}$ ($m^2$/g) | Vact ($nm^3$) | Plate thickness CV | Particle diameter CV | Plate thickness CV/Particle diameter CV | Hc (kA/m) | SFD (23° C.) | SFD (−190° C.) | Al/Fe (at %) |
|---|---|---|---|---|---|---|---|---|---|---|---|---|---|
| 1 | A | 3 | 660 | 5 | 77 | 1660 | 16 | 35 | 0.46 | 372 | 0.32 | 0.17 | 12.4 |
| 2 | A | 3 | 655 | 5 | 83 | 1560 | 15 | 35 | 0.43 | 349 | 0.33 | 0.18 | 11.8 |
| 3 | A | 3 | 645 | 5 | 96 | 1480 | 14 | 34 | 0.45 | 306 | 0.35 | 0.17 | 13.2 |
| 4 | A | 3 | 605 | 5 | 121 | 1260 | 16 | 35 | 0.46 | 216 | 0.47 | 0.19 | 12.6 |
| 5 | A | 3 | 600 | 5 | 130 | 1150 | 14 | 33 | 0.42 | 191 | 0.72 | 0.20 | 12.0 |
| 6 | A | 3 | 590 | 5 | 152 | 880 | 15 | 32 | 0.47 | 95 | — | — | 10.8 |
| 7 | B | 6 | 645 | 5 | 90 | 1550 | 14 | 22 | 0.64 | 206 | 0.75 | 0.39 | 6.3 |
| 8 | B | 3 | 645 | 5 | 90 | 1570 | 13 | 22 | 0.59 | 213 | 0.70 | 0.35 | 6.4 |
| 9 | C | 3 | 650 | 5 | 107 | 1320 | 20 | 35 | 0.57 | 258 | 0.60 | 0.23 | 10.4 |
| 10 | C | 3 | 710 | 5 | 89 | 1580 | 21 | 36 | 0.58 | 322 | 0.48 | 0.25 | 10.6 |
| 11 | D | 6 | 700 | 5 | 97 | 1350 | 18 | 22 | 0.82 | 299 | 0.95 | 0.58 | 15.0 |
| 12 | E | 6 | 610 | 5 | 85 | 1610 | 22 | 33 | 0.67 | 206 | 0.69 | 0.43 | 0 |
| 13 | F | 6 | 645 | 0.17 | 102 | 1500 | 20 | 29 | 0.69 | 172 | 0.88 | 0.39 | 2.8 |

TABLE 3

| Medium No. | Magnetic material No. | | Output (dB) | Noise (dB) | SNR (dB) | Signal decay %/decade |
|---|---|---|---|---|---|---|
| 1 | Comp. Ex. | 1 | 0.6 | 0 | 0.6 | >−0.5 |
| 2 | Ex. | 2 | 0.3 | −0.8 | 1.1 | >−0.5 |
| 3 | Ex. | 3 | 0 | −1.5 | 1.5 | >−0.5 |
| 4 | Ex. | 4 | −0.6 | −2.7 | 2.1 | >−0.5 |
| 5 | Ex. | 5 | −1.5 | −3.3 | 1.8 | −0.7 |
| 6 | Comp. Ex. | 6 | −2.9 | −3.4 | 0.5 | −1.9 |
| 7 | Comp. Ex. | 7 | −0.1 | −0.6 | 0.5 | −0.7 |
| 8 | Ex. | 8 | 0.1 | −0.7 | 0.8 | >−0.5 |
| 9 | Ex. | 9 | −0.2 | −1.8 | 1.6 | −0.6 |
| 10 | Ex. | 10 | 0.5 | −0.4 | 0.9 | >−0.5 |
| 11 | Comp. Ex. | 11 | −2.0 | −1.0 | −1.0 | −1.1 |
| 12 | Comp. Ex. | 12 | 0 | 0 | 0 | >−0.5 |
| 13 | Comp. Ex. | 13 | 0 | 0.6 | −0.6 | −0.9 |

Evaluation Results

Based on the results given in Tables 2 and 3, the use of hexagonal ferrite magnetic powder in which both the activation volume and the ratio (coefficient of plate thickness variation/coefficient of particle diameter variation) of the coefficient of plate thickness variation to the coefficient of particle diameter variation were controlled was determined to provide a magnetic recording medium exhibiting both good electromagnetic characteristics (a good SNR) and high thermal stability (little signal decay).

FIGS. 1A to 1F are plots of the plate thickness CV, particle diameter CV, and ratio X (plate thickness CV/particle diameter CV) obtained above against the SFD. The SFD (−190° C.) was the SFD as measured at −190° C. by cooling with liquid nitrogen to reduce the effects of shape anisotropy. The smaller the value of the SFD (−190° C.), the sharper the crystal magnetic anisotropy distribution and the greater the thermal stability. A comparison of the graph in FIG. 1B with the graphs in FIGS. 1A and 1C reveals that a good correlation was established between the ratio X (plate thickness CV/particle diameter CV) and the SFD (−190° C.) indicating thermal stability. By contrast, no good correlation was found to have been established between the plate thickness CV, particle diameter CV, and SFD (−190° C.).

Figure 1E:
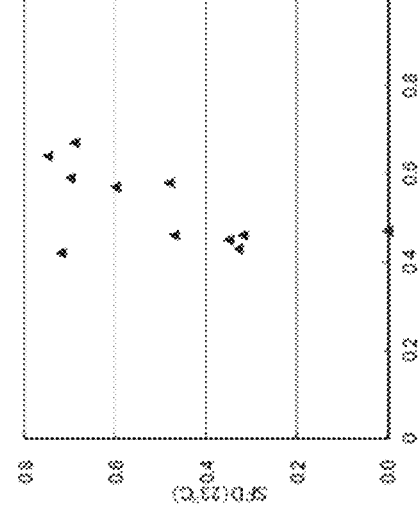
Figure 1F:
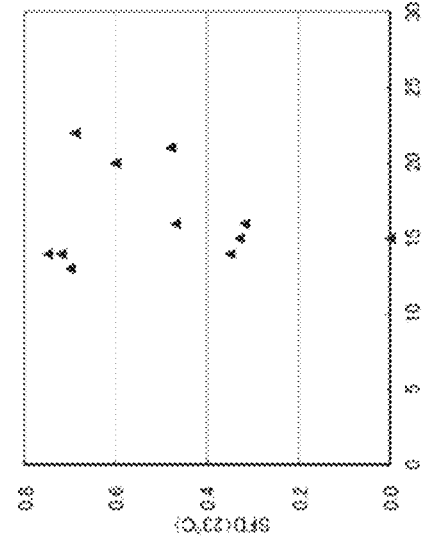

Further, FIGS. 1D to 1F are graphs of the plate thickness CV, particle diameter CV, ratio X (plate thickness CV/particle diameter CV) plotted against the SFD. As set forth above, the greater the reduction in the SFD (23° C.), the greater the reduction in the medium noise that was possible. A comparison of the graph in FIG. 1E with the graphs in FIGS. 1D and 1F reveals that a good correlation was established between the ratio X (plate thickness CV/particle diameter CV) and the SFD (23° C.) contributing to noise reduction. By contrast, no good correlation was found to have been established between the plate thickness CV, particle diameter CV, and SFD (23° C.).

An aspect of the present invention is useful in the field of manufacturing magnetic recording media for high-density recording, such as backup tapes, that are required to afford high reliability for extended periods.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. Hexagonal barium ferrite magnetic powder, which has: an activation volume ranging from 900 $nm^3$ to 1,600 $nm^3$, and a ratio of a coefficient of plate thickness variation to a coefficient of particle diameter variation, coefficient of plate thickness variation/coefficient of particle diameter variation, ranging from 0.40 to 0.60.

2. The hexagonal barium ferrite magnetic powder according to claim 1, which has a coercive force ranging from 195 kA/m to 400 kA/m.

3. The hexagonal barium ferrite magnetic powder according to claim 1, which exhibits a switching field distribution, SFD, ranging from 0.2 to 0.8.

4. The hexagonal barium ferrite magnetic powder according to claim 2, which exhibits a switching field distribution, SFD, ranging from 0.2 to 0.8.

5. The hexagonal barium ferrite magnetic powder according to claim 1, which has a specific surface area ranging from 80 $m^2/g$ to 150 $m^2/g$.

6. The hexagonal barium ferrite magnetic powder according to claim 2, which has a specific surface area ranging from 80 $m^2/g$ to 150 $m^2/g$.

7. The hexagonal barium ferrite magnetic powder according to claim 3, which has a specific surface area ranging from 80 $m^2/g$ to 150 $m^2/g$.

8. The hexagonal barium ferrite magnetic powder according to claim 1, wherein the content of rare earth elements relative to Fe ranges from 0 atomic percent to 0.1 atomic percent.

9. The hexagonal barium ferrite magnetic powder according to claim 2, wherein the content of rare earth elements relative to Fe ranges from 0 atomic percent to 0.1 atomic percent.

10. The hexagonal barium ferrite magnetic powder according to claim 3, wherein the content of rare earth elements relative to Fe ranges from 0 atomic percent to 0.1 atomic percent.

11. The hexagonal barium ferrite magnetic powder according to claim 1, which comprises 1.5 atomic percent to 20 atomic percent of Al relative to Fe.

12. The hexagonal barium ferrite magnetic powder according to claim 2, which comprises 1.5 atomic percent to 20 atomic percent of Al relative to Fe.

13. The hexagonal barium ferrite magnetic powder according to claim 3, which comprises 1.5 atomic percent to 20 atomic percent of Al relative to Fe.

14. The hexagonal barium ferrite magnetic powder according to claim 8, which comprises 1.5 atomic percent to 20 atomic percent of Al relative to Fe.

15. The hexagonal barium ferrite magnetic powder according to claim 1, which is magnetic powder for magnetic recording.

16. A magnetic recording medium comprising a magnetic layer comprising ferromagnetic powder and binder on a nonmagnetic support, wherein the ferromagnetic powder is the hexagonal barium ferrite magnetic powder according to claim 1.

* * * * *